(12) United States Patent
Hart

(10) Patent No.: US 7,412,796 B1
(45) Date of Patent: Aug. 19, 2008

(54) STINGER RIG WITH SECOND RING EYE BAIT HOOK

(76) Inventor: Glenn Robert Hart, 11121 NW. 16th St., Pembroke Pines, FL (US) 33026

( * ) Notice: Subject to any disclaimer, the term of this patent is extended or adjusted under 35 U.S.C. 154(b) by 0 days.

(21) Appl. No.: 10/637,363

(22) Filed: Aug. 8, 2003

(51) Int. Cl.
*A01K 91/04* (2006.01)
(52) U.S. Cl. ..................................... 43/44.83; 43/44.98
(58) Field of Classification Search ..... 43/44.83–44.85, 43/44.98, 43.1; D22/144
See application file for complete search history.

(56) References Cited

U.S. PATENT DOCUMENTS

| | | | | |
|---|---|---|---|---|
| 2,815,603 A | * | 12/1957 | Bandemer | 43/43.16 |
| 2,823,486 A | * | 2/1958 | Behee | 43/43.16 |
| 2,984,930 A | * | 5/1961 | Fadely | 43/44.84 |
| 3,130,514 A | * | 4/1964 | Cornick | 43/37 |
| 3,293,791 A | * | 12/1966 | Hinkson | 43/44.4 |
| 3,604,143 A | * | 9/1971 | Sauers | 43/44.83 |
| 3,736,691 A | * | 6/1973 | Gist | 43/44.8 |
| 3,778,921 A | * | 12/1973 | Peterson | 43/44.8 |
| 4,107,866 A | * | 8/1978 | Manno | 43/44.83 |
| 4,209,933 A | * | 7/1980 | Manno | 43/43.15 |
| 4,229,901 A | * | 10/1980 | Flowers et al. | 43/44.4 |
| 5,083,394 A | * | 1/1992 | Harwig | 43/43.16 |
| 5,301,452 A | * | 4/1994 | Roach | 43/42.29 |
| 5,577,339 A | * | 11/1996 | Haigh | 43/42.74 |
| 5,664,365 A | * | 9/1997 | Walden | 43/44.82 |
| 5,881,490 A | * | 3/1999 | Richardson | 43/44.2 |
| 5,884,428 A | * | 3/1999 | Shelton | 43/4.5 |
| 6,112,451 A | * | 9/2000 | Webb | 43/42.19 |
| D469,502 S | * | 1/2003 | Shelton | D22/144 |

* cited by examiner

*Primary Examiner*—Bret Hayes
(74) *Attorney, Agent, or Firm*—Frank L. Kubler

(57) ABSTRACT

A bait hook for constructing a stinger rig includes a hook proximal end including a primary leader engaging first ring eye; a hook shank including a shank connecting segment extending distally from the first ring eye and a shank hook segment arching laterally from the shank connecting segment, and a hook distal end; and a second ring eye extending from the hook shank for engaging a trailer leader for connecting the bait hook to a trailer bait hook.

3 Claims, 3 Drawing Sheets

Prior Art FIGURE 1

STINGER RIG WITH SECOND RING EYE BAIT HOOK

BACKGROUND OF THE INVENTION

1. Field of the Invention

The present invention relates generally to the field of fishing equipment. More specifically the present invention relates to a bait hook having a hook proximal end including a first ring eye for engaging a primary leader, a hook shank including a shank connecting segment extending distally from the first ring eye and a shank hook segment arching laterally from the shank connecting segment and including a barb, the bait hook terminating in a hook distal end, and a second ring eye extending from the hook shank and spaced distally from the first ring eye for engaging a trailer leader connecting the present bait hook to a trailer bait hook. The opening of the second ring eye preferably is aligned with the shank connecting segment longitudinal axis so that tensile force is transmitted axially through the shank connecting segment to the trailer leader to keep the hook balanced. The hook shank optionally includes a plurality of shank hook segments extending radially from a common shank connecting segment or from corresponding multiple shank connecting segments.

2. Description of the Prior Art

There have long been bait hooks and leaders interconnected to form what have been referred to as stinger rigs including a primary leader interconnecting a fishing line and a primary bait hook and a trailer leader interconnecting the primary leader and a trailer bait hook which trails the primary bait hook. The primary bait hook is intended to engage the mouth of the fish while the trailer hook engages the middle body of the fish. A problem with these stinger rigs has been that the trailer leader sometimes swings across the open arch of the primary bait hook and obstructs engagement of a fish. Another problem has been that the trailer leader can bind, break or twist on the fish being caught.

It is thus an object of the present invention to provide a primary bait hook which includes means for engaging a trailer leader so that the trailer leader does not have to be connected to a primary leader, and which also can be used in series in a single stinger rig to additionally function as a first or as subsequent trailer bait hooks trailing a second or subsequent trailer bait hooks.

It is another object of the present invention to provide such a bait hook in which the means for engaging a secondary leader is located at or near the distal end of the hook so that the trailer leader does not cross the shank segment and does not bind, break or twist on a fish being caught.

It is still another object of the present invention to provide such a bait hook which can include only one, or which can include multiple shank hook segments.

It is finally an object of the present invention to provide such a bait hook which has substantially the same manufacturing cost as a conventional bait hook and is sturdy and reliable.

SUMMARY OF THE INVENTION

The present invention accomplishes the above-stated objectives, as well as others, as may be determined by a fair reading and interpretation of the entire specification.

A bait hook is provided for constructing a stinger rig, the bait hook including a hook proximal end including a primary leader engaging first ring eye; a hook shank including a shank connecting segment extending distally from the first ring eye and a shank hook segment arching laterally from the shank connecting segment, and a hook distal end; and a second ring eye extending from the hook shank for engaging a trailer leader for connecting the bait hook to a trailer bait hook.

The shank connecting segment has a shank connecting segment longitudinal axis and the second ring eye has a second ring eye opening and the second ring eye opening preferably is substantially aligned with the shank connecting segment longitudinal axis, so that tensile force is transmitted axially through the shank connecting segment to a trailer leader to keep the bait hook balanced. The shank connecting segment preferably has a shank connecting segment longitudinal axis, and the second ring eye extends from the shank hook segment in a position laterally offset from the shank connecting segment longitudinal axis. The shank connecting segment preferably includes a barb. The hook shank optionally includes several shank hook segments extending radially from at least one shank connecting segment.

A bait hook is further provided for constructing a stinger rig, the bait hook including a hook proximal end including a first leader engaging structure; a hook shank including a shank connecting segment extending distally from the first leader engaging structure a shank hook segment arching laterally from the shank connecting segment, and a hook distal end; and a second leader engaging structure extending from the hook shank for engaging a trailer leader for connecting the bait hook to a trailer bait hook. The first leader engaging structure preferably includes a first ring eye and the second leader engaging structure preferably includes a second ring eye. Once again, the shank connecting segment has a shank connecting segment longitudinal axis and the second ring eye has a second ring eye opening and the second ring eye opening preferably is substantially aligned with the shank connecting segment longitudinal axis, so that tensile force is transmitted axially through the shank connecting segment to a trailer leader to keep the bait hook balanced.

A stinger rig is provided including a primary leader having a primary leader proximal end and a primary leader distal end; a trailer leader having a trailer leader proximal end and a trailer leader distal end; a primary bait hook including a hook proximal end including a first leader engaging structure engaging the primary leader distal end; a hook shank including a shank connecting segment extending distally from the first leader engaging structure and a shank hook segment arching laterally from the shank connecting segment, and a hook distal end; and a second leader engaging structure extending from the hook shank and engaging the trailer leader proximal end; and a trailer bait hook engaging the trailer leader distal end. Once again, the first leader engaging structure preferably includes a first ring eye and the second leader engaging structure preferably includes a second ring eye.

BRIEF DESCRIPTION OF THE DRAWINGS

Various other objects, advantages, and features of the invention will become apparent to those skilled in the art from the following discussion taken in conjunction with the following drawings, in which.

Prior Art

DETAILED DESCRIPTION OF THE PREFERRED EMBODIMENTS

Figure 1:
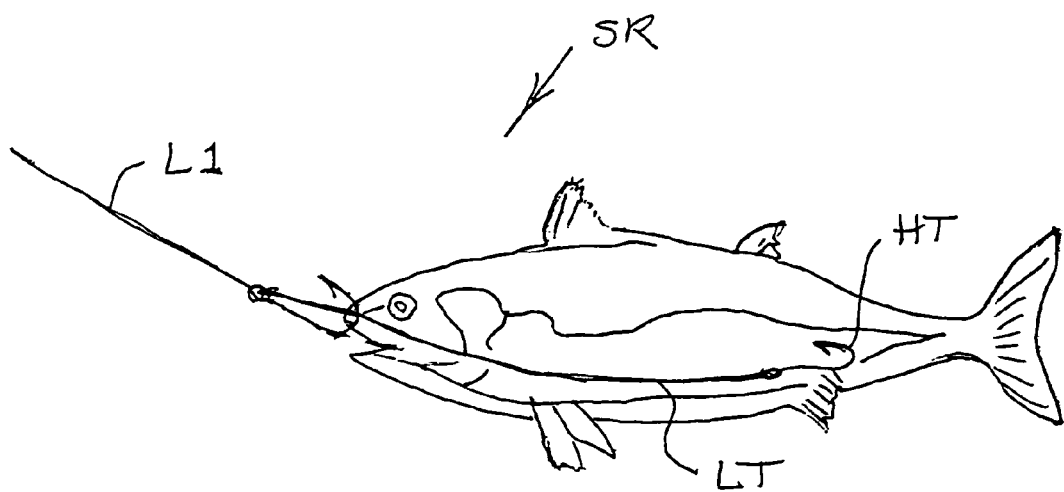
FIG. 1 is a side view of the conventional stinger rig, in which a first hook and a secondary leader are connected to a primary leader and a second hook is connected to the secondary leader, the stinger rig shown engaging a fish.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
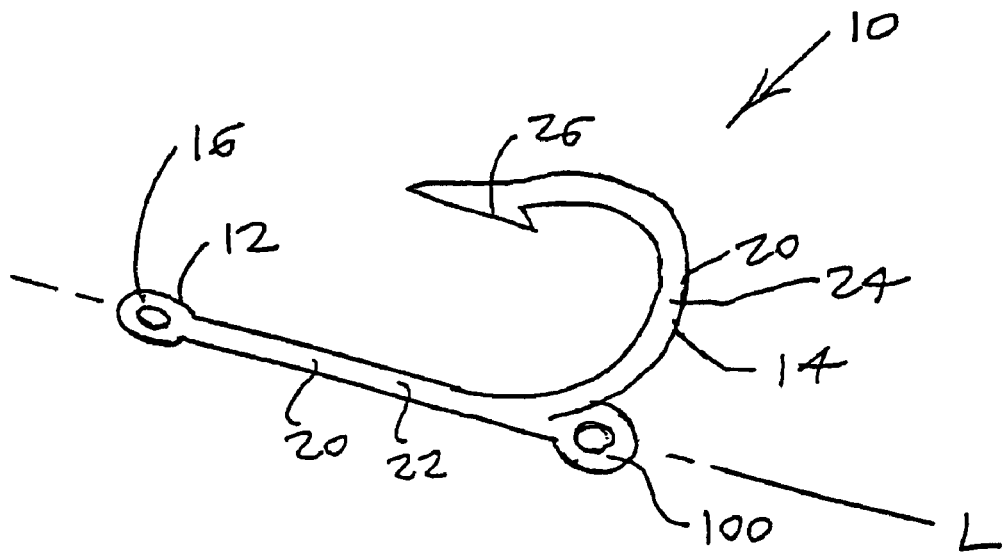
FIG. 2 is a side view of a preferred embodiment of the inventive bait hook, having the second ring eye opening aligned with the shank connecting segment longitudinal axis.
Figure 3:
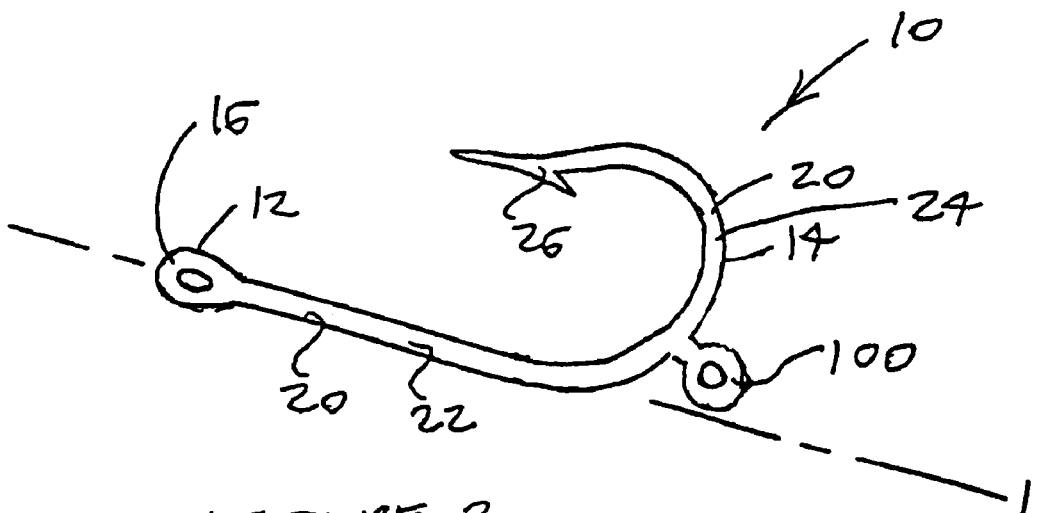
FIG. 3 is a side view of another preferred embodiment of the inventive bait hook, having the second ring eye opening laterally offset from the shank connecting segment longitudinal axis.
Figure 4:
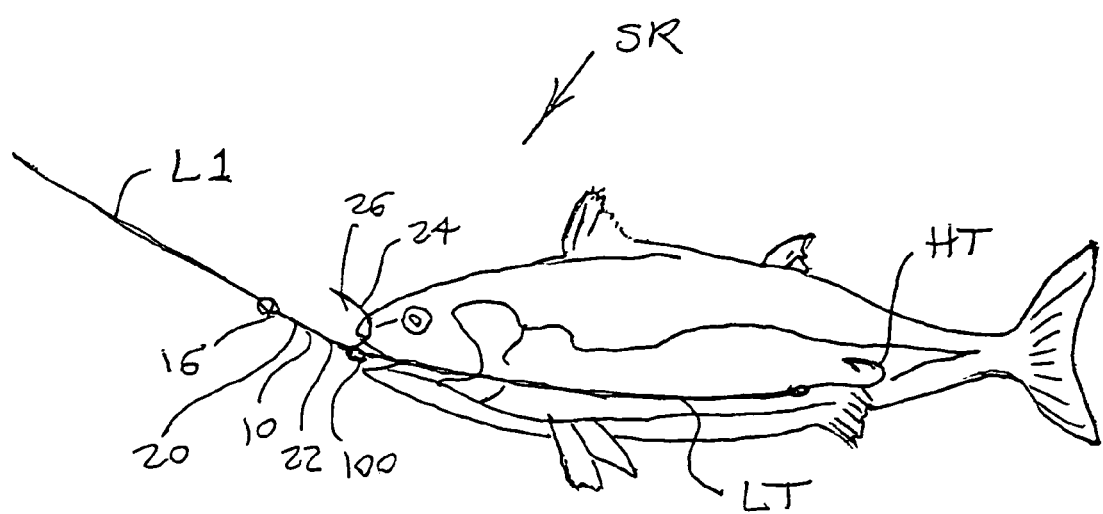
FIG. 4 is a side view of the hook connected to primary and trailer leaders and a trailer hook to form a stinger rig, the stinger rig shown engaging a fish.

Referring to FIGS. 2-4, a bait hook 10 for constructing a stinger rig SR is disclosed having a hook proximal end 12 including a first ring eye 16 for engaging a primary leader L1, a hook shank 20 including a shank connecting segment 22 extending distally from the first ring eye 16 and a shank hook segment 24 arching laterally from the shank connecting segment 22 and including a barb 26, the bait hook 10 terminating in a hook distal end 14, and a second ring eye 100 extending from the hook shank 20 and spaced distally from first ring eye 16 for engaging a trailer leader LT, sometimes referred to as a stinger leader, connecting the primary bait hook 10 to a trailer bait hook HT, sometimes referred to as a stinger hook. The first ring eye 16 may be more broadly described as a first leader engaging structure. The second ring eye 100 may be more broadly described as a second leader engaging structure. The second ring eye 100 has a second ring eye opening 102 which preferably is aligned with the longitudinal axis L of the shank connecting segment 24 so that tensile force is transmitted axially through the shank connecting segment 22 to the trailer leader LT to keep the present bait hook 10 balanced. See FIG. 2.

Alternatively the second ring eye 100 extends from the shank hook segment 24 in a position laterally offset from the shank connecting segment longitudinal axis L. See FIG. 3. The hook shank 20 optionally includes a plurality of shank hook segments 24 extending radially from a common shank connecting segment 22 or from corresponding multiple shank connecting segments 22. The term "ring eye" is used in this application to refer both to a closed ring and also to an open haywire loop as well as to any equivalent line or leader engaging structure. The present bait hook 10 also can be used in series in a single stinger rig SR to additionally function as a first or subsequent trailer bait hook HT trailing a second or subsequent trailer bait hook HT. The inventive bait hook 10 preferably is formed of high carbon steel and hot dipped in zinc to give bait hook 10 the strength and durability needed for fishing at sea.

While the invention has been described, disclosed, illustrated and shown in various terms or certain embodiments or modifications which it has assumed in practice, the scope of the invention is not intended to be, nor should it be deemed to be, limit d thereby and such other modifications or embodiments as may be suggested by the teachings herein are particularly reserved especially as they fall within the breadth and scope of the claims here appended.

I claim:

1. A stinger rig comprising:
   a bait hook, the bait hook comprising a hook proximal end including a first ring eye, a hook shank including a shank connecting segment having a shank connecting segment longitudinal axis and extending distally from said first ring eye and a shank hook segment arching laterally from said shank connecting segment, and a hook distal end;
   a primary leader engaging said first ring eye;
   a trailer leader;
   a trailer bait hook; and,
   the bait hook further comprising a second ring eye extending from said hook distal end engaging said trailer leader and connecting said bait hook to said trailer bait hook, said second ring eye having a second ring eye opening which is substantially aligned with said shank connecting segment longitudinal axis such that tensile force from said trailer leader is transmitted from said second ring eye axially through said shank connecting segment to said first ring eye to keen said bait hook balanced.

2. The stinger rig of claim 1, wherein said shank connecting segment comprises a barb.

3. The stinger rig of claim 1, wherein said hook shank comprises a plurality of shank hook segments extending radially from said shank connecting segment.

\* \* \* \* \*